United States Patent [19]

Kevorkian et al.

[11] Patent Number: 5,710,629
[45] Date of Patent: Jan. 20, 1998

[54] INTERFEROMETRIC MEASURING DEVICE FORMING A SPACIAL INTERFERENCE PATTERN

[75] Inventors: Antoine Kevorkian, Grenoble; Isabelle Duport-Schanen, La Tronche; Pierre Benech, Grenoble, all of France

[73] Assignee: Schneider Electric S.A., France

[21] Appl. No.: 432,118

[22] PCT Filed: Dec. 6, 1993

[86] PCT No.: PCT/FR93/01194

§ 371 Date: May 5, 1995

§ 102(e) Date: May 5, 1995

[87] PCT Pub. No.: WO94/14028

PCT Pub. Date: Jun. 23, 1994

[30] Foreign Application Priority Data

Dec. 10, 1992 [FR] France .................. 92 15002

[51] Int. Cl.$^6$ .................. G01B 9/02
[52] U.S. Cl. .................. 356/345
[58] Field of Search .................. 356/345, 349, 356/354, 358; 385/12, 14

[56] References Cited

U.S. PATENT DOCUMENTS

| | | | |
|---|---|---|---|
| 4,850,693 | 7/1989 | Deason et al. | 356/35.5 |
| 4,865,453 | 9/1989 | Gidon et al. | 356/358 |
| 5,141,319 | 8/1992 | Kajimura et al. | 356/358 |

FOREIGN PATENT DOCUMENTS

| | | |
|---|---|---|
| 1108903 | 9/1981 | Canada . |
| 0286528 | 10/1988 | European Pat. Off. . |
| WO 90/11484 | 10/1990 | WIPO . |
| WO92/20990 | 11/1992 | WIPO . |
| WO920990 | 11/1992 | WIPO . |

OTHER PUBLICATIONS

IEE Proceedings, vol. 147, Pt. J, No. 6, Dec. 1990. Stevenage, Herts., GB pp. 347–356. M.N. Armenise et al. "Design and simulation of an on-board lithium niobate integrated optical preprocessor".

*Primary Examiner*—Frank G. Font
*Assistant Examiner*—Amanda Merlino
*Attorney, Agent, or Firm*—Parkhurst, Wendel & Burr, L.L.P.

[57] ABSTRACT

Two input beams (10, 20) of the interferometric measuring device, achieved according to the integrated optics technology, are broadened so as to form two spread flat beams creating an interference pattern (30). Two detectors (14, 15) supply two measuring signals, preferably in phase quadrature, representative of two points of the interference plane.

9 Claims, 2 Drawing Sheets

INTERFEROMETRIC MEASURING DEVICE FORMING A SPACIAL INTERFERENCE PATTERN

BACKGROUND OF THE INVENTION

The present invention relates to an interferometric measuring device comprising two waveguides arranged in a rigid block and achieved according to an integrated optics technology to constitute two distinct optic transmission channels for mutually coherent input signals, means to make these signals interfere and means for analyzing the interference fringes obtained.

To perform interferometric measurements of the optic path variations due to the variations of a variable physical parameter, and to determine the direction in which these variations take place, it is necessary, with known apparatuses, to have available two identical pieces of equipment each enabling interference fringes of signals coming from two distinct optic channels to be obtained, but one of which is in addition equipped with a phase shifter, such as for example a quarter-wave plate.

Document EP-A-286,528, for example, uses two dephased reference beams each interfering with a part of a measurement beam so as to form two interference signals whose variations in time are representative of a mobile movement and of the direction of this movement. In document WO-A-9,011,484, analog signals are obtained from comparison to a reference signal of two measurement signals corresponding to two different polarization directions.

The fact of having to use two pieces of equipment may induce errors in the measurements and naturally complicates the handling operations.

In particular, when the experimental setup is made with discrete components in conventional optics, a complex alignment and tuning procedure has to be implemented.

SUMMARY OF THE INVENTION

The object of the invention is to overcome these drawbacks by achieving a precise, reliable interferometric measuring device of simple and economical construction, and considerably easier to use than known devices.

For this purpose, the device according to the invention is characterized in that it comprises a beam broadening device interposed on each optic channel so as to generate spread flat beams, the broadening devices of the two channels being identical and disposed in such a way that the spread flat beams have substantially flat wavefronts forming between them a preset angle presenting an axis of symmetry, said wave fronts creating a spatial interference pattern in an interference zone, the analysis means comprising detection means disposed in the interference zone perpendicularly to said axis of symmetry.

The angle is preferably about one degree.

According to a particularly advantageous embodiment, the beam broadening devices comprise at least one planar lens achieved according to an integrated optics technology into said rigid block.

According to an alternative embodiment, the beam broadening devices may comprise tapers.

According to a preferred embodiment, the means for analyzing the fringes may comprise a detection device comprising at least one extended detector having a length corresponding substantially to a half-fringe of the interference pattern.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DETAILED DESCRIPTION OF THE PREFERRED EMBODIMENT

Figure 1:
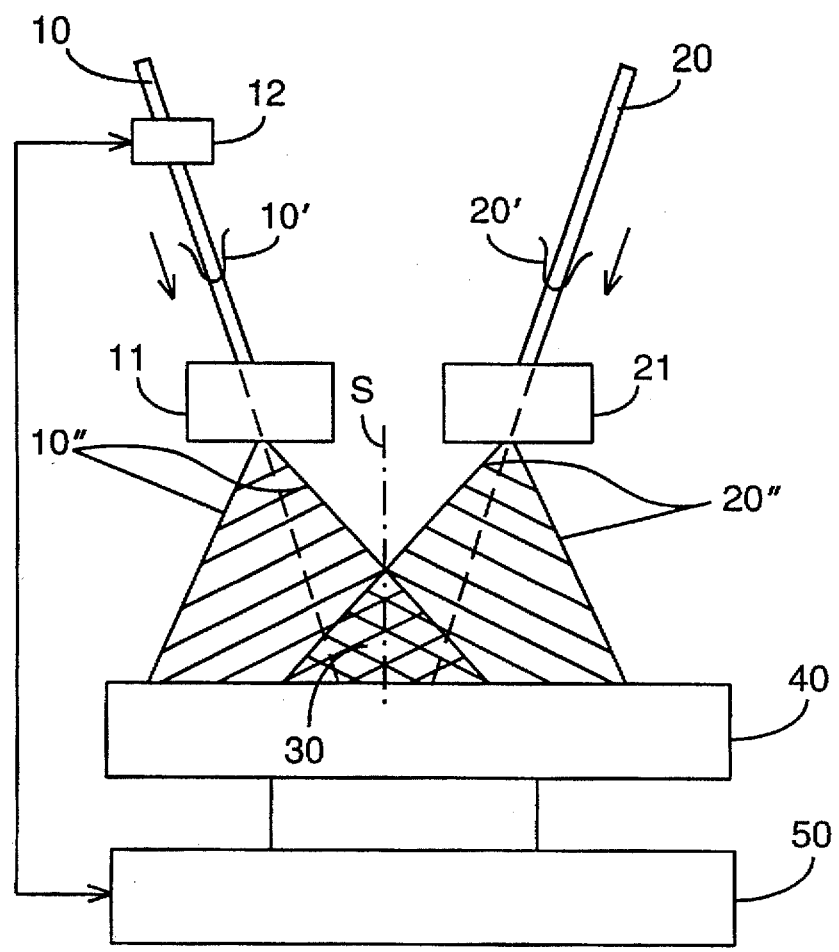
FIG. 1 represents a schematic view illustrating the operating principle of the device according to the invention.

FIG. 1 is a schematic view which illustrates the principle of the interferometric measuring device according to the invention. Two optical guides 10 and 20 convey mutually coherent input signals. On each of these guides which determine two optic channels, there is placed a beam broadening device 11 and 21, respectively, that function is to extend the spatial profile of each optic channel. Upstream from the broadening devices, the wavefronts 10', 20' are called "confined", and downstream the wavefronts 10", 20" are called "broad". The beams obtained on output from the broadening devices present a substantially flat wavefront. The broadening devices 11, 21 are identical and disposed spatially in such a way that the flat wavefronts obtained form between them a preset angle, which is not zero, defining an axis of symmetry. The flat wavefronts output from the two broadening devices thus form, in an interference zone 30, a spatial interference pattern. The spatial interference pattern comprises regular, sinusoidal interference fringes perpendicularly to the axis of symmetry of the above-mentioned angle. The spatial separation of the fringes, i.e., the interference pattern period, is defined by the wavelength of the input signals and by the angle between the wavefronts of the broadened beams. A variation of the phase difference between the input signals, linked to a variation of a physical parameter to be measured, causes an offset of the whole interference pattern, perpendicularly to the above-mentioned axis of symmetry.

By suitably orienting the guides, notably by introducing a calibrated angle between the optical guides, the interference zone 30 due to the superposition of the waves downstream from the beam broadening devices is created. It is in this zone that interferometric measurements can be made by means of suitable measuring equipment 40. The results of these measurements can then be transmitted to a processing, computation, and possible display unit 50, with a view to their interpretation which consists in deducing information on the physical parameter influencing routing of the signals on at least one of said optic channels.

If synchronous detection is to be performed, a variable phase shift device 12 can be placed on at least one of the optic channels, either in the confined part or in the broad part. The phase difference induced by this device may be due to a variation of index by thermal effect, or by electro-optic effect or by any other variable physical parameter. If this is the case, the unit 50 can be coupled to the phase shift source for the purposes of monitoring the latter.

Figure 2:
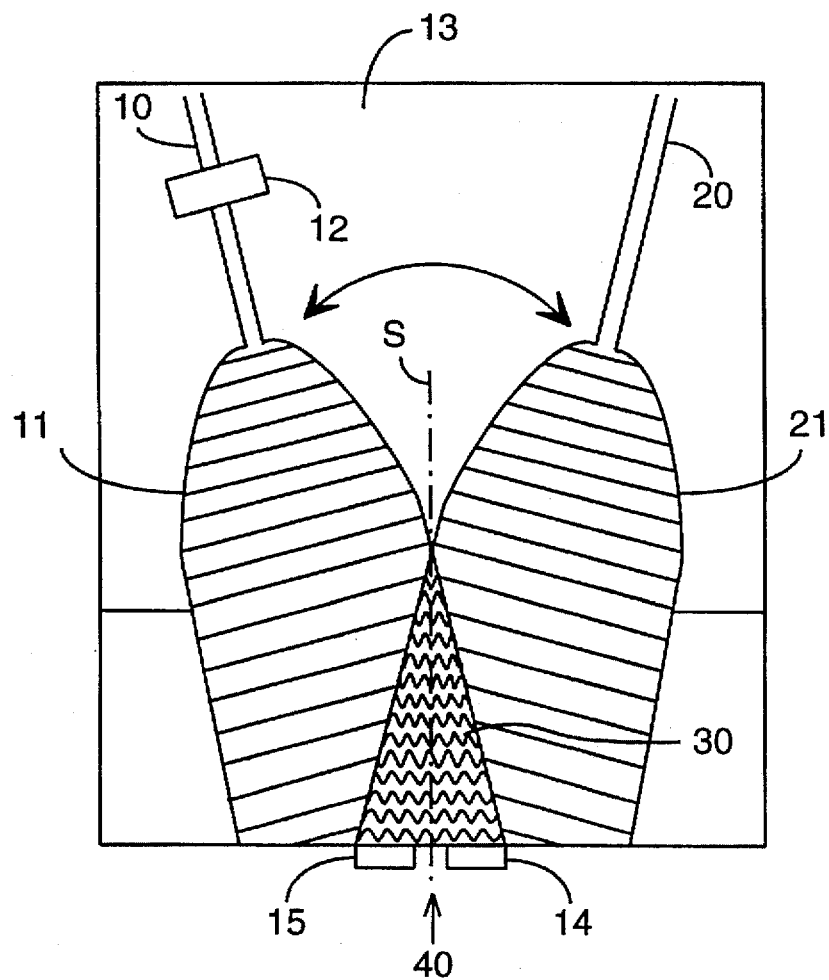
FIG. 2 represents an advantageous embodiment of the device of the invention.

FIG. 2 illustrates an interferometric measuring device based on the principle described above and achieved according to an integrated optics technique. The device is mainly formed by a block 13 which may be formed by a doped glass substrate, for example, by selective treatment by means of potassium or silver nitrate or thallium sulphate baths or by a doped silica substrate deposited on a silicon support.

The two waveguides 10 and 20 and the beam broadening devices 11 and 21 are prepared on this block 13 by means of suitable masks and by engraving techniques well-mastered in the field of photolithography. These devices are preferably planar lenses, or any other device enabling substantially flat wavefronts to be obtained, such as for example tapers. To give an example, the width of the optic channels in the confined part is about 6 to 8 μm and their transverse dimension in the broad part is substantially comprised between 1/10th mm and 1 mm. As represented in the figure, the broadening devices 11 and 21 are identical and form an angle between them, in such a way that the flat fronts form a preset angle between them. The zone common to the two flat beams constitutes the interference zone 30 in which the spatial interference pattern is formed.

The interference fringes formed are sinusoidal, regular, and perpendicular to the axis of symmetry of the flat fronts which, in the figures, corresponds to the axis of symmetry S of the assembly formed by the broadening devices 11 and 21.

The spatial separation of the fringes is defined by the wavelength of the input signals and by the angle made between the wavefronts of the broadened beams. Unlike what happens with waveguides formed by individual optical fibers whose positioning is often fairly imprecise, the guides achieved according to an integrated optics technology are perfectly fixed and the above-mentioned angle is extremely precise. The positioning of the guides is in fact defined by the geometry of the mask which was used to achieve them. For a very small angle, the interference fringes are very far apart and for a larger angle the fringes are closer together. To give a non-restrictive example, the angle between the wavefronts may be about 1 or 1.5°.

On the output face 14 of the block, and in the interference zone 30, there are fixed one or more detectors. The detectors, which enable different points of the interference plane or different segments in the case of spread detectors to be observed, are disposed perpendicularly to the axis of symmetry of the flat fronts. The regularity of the interference pattern in the whole interference zone 30, both parallel to the axis of symmetry and along this axis, enables detectors to be used whose exact position is not significant. Only the distance between the photodetectors is important, as it is this, along with the above-mentioned angle, which determines the phase difference.

In FIG. 2, a particular embodiment has been represented with two detectors 14 and 15. The detectors 14 and 15 are disposed at a preset distance from one another, but this fixed distance may be any distance. According to a preferred embodiment, the detectors 14 and 15 are formed by two photodiodes whose length corresponds to a half-fringe and with a spacing of ¼+nl (wherein l is the fringe width and n an integer) to obtain two electronic signals in phase quadrature. The use of non-punctual detectors may enable the amplitude of the detected signals, and consequently the measuring precision, to be increased.

The detectors are, for example, stuck or affixed by any suitable means to the edge 16 of the block 13. According to an alternative embodiment, it is possible to shift the interference pattern and to locate the detectors at a distance.

The detection device can also be formed by a set of punctual detectors constituting a multidetection device, for example a CCD array, so as to collect the whole of the interference pattern in detailed manner.

The detection device can, in certain cases, comprise a single detector element. In the case where it comprises several detector elements, the latter supply electronic signals presenting a set phase difference, which is preferably equal to $\pi/2$.

We claim:

1. A fully integrated interferometric measuring device, comprising:

a rigid block including first and second waveguides which form respective first and second optical transmission channels for mutually coherent input signals, said rigid block including broadening means for generating first and second spread flat beams respectively in the first and second channels such that each spread flat beam has substantially flat wavefronts, the wavefronts of the first and second beams intersecting each other along an axis of symmetry and forming a preset angle therebetween, the wavefronts creating a spatial interference pattern comprising fringes along an interference zone which extends perpendicular to the axis of symmetry, said broadening means comprising at least one broadening device provided in the first and second optical transmission channels; and analyzing means for analyzing said interference fringes, the analyzing means comprising detectors disposed in the interference zone along an output face of the rigid block.

2. The device of claim 1, wherein said present angle is 1°.

3. The device of claim 1, wherein the at least one beam broadening device comprises at least one planar lens integrated with said rigid block.

4. The device of claim 1, wherein the at least one beam broadening device comprises at least one taper.

5. The device of claim 1, wherein the detection means comprises at least one detector having a length corresponding substantially to a half fringe of the interference pattern.

6. The device of claim 5, wherein the device comprises two detectors spaced apart from each other by a distance equal to ¼+nl, wherein l is the fringe width and n is an integer.

7. The device of claim 1, wherein said detection means comprises a detection device supplying at least two electronic signals providing a preset phase difference.

8. The device of claim 7, wherein said detection device supplies two electronic signals in phase quadrature.

9. The device of claim 1, wherein said detectors comprise an array of detector elements positioned to detect substantially the entirety of the interference pattern.

* * * * *